(12) United States Patent
Jing et al.

(10) Patent No.: US 10,793,746 B2
(45) Date of Patent: Oct. 6, 2020

(54) COATING COMPOSITION COMPRISING SILICA-POLYMER CORE-SHELL PARTICLES, METHOD OF MAKING COMPOSITION AND ARTICLE

(71) Applicant: 3M INNOVATIVE PROPERTIES COMPANY, St. Paul, MN (US)

(72) Inventors: Naiyong Jing, St. Paul, MN (US); Shupeng Wu, Shanghai (CN); Zhigang Yu, Shanghai (CN); Jiafeng Liu, Minneapolis, MN (US); Mingna Xiong, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 127 days.

(21) Appl. No.: 16/065,850

(22) PCT Filed: Dec. 25, 2015

(86) PCT No.: PCT/CN2015/098919
§ 371 (c)(1),
(2) Date: Jun. 25, 2018

(87) PCT Pub. No.: WO2017/107184
PCT Pub. Date: Jun. 29, 2017

(65) Prior Publication Data
US 2019/0010354 A1    Jan. 10, 2019

(51) Int. Cl.
*B32B 5/16* (2006.01)
*C09D 175/04* (2006.01)
(Continued)

(52) U.S. Cl.
CPC .......... *C09D 175/04* (2013.01); *C08J 3/128* (2013.01); *C08K 3/36* (2013.01); *C08K 9/04* (2013.01);
(Continued)

(58) Field of Classification Search
CPC ........ C09D 5/028; C09D 7/67; C09D 17/001; C09D 17/007; C09D 175/04;
(Continued)

(56) References Cited

U.S. PATENT DOCUMENTS

| 4,806,665 A | 2/1989 | Jones |
| 2,877,520 A | 8/1999 | Watanabe |

(Continued)

FOREIGN PATENT DOCUMENTS

| EP | 2 674 449 | 12/2013 |
| EP | 2674450 | 12/2013 |

(Continued)

OTHER PUBLICATIONS

Koppel, "Analysis of Macromolecular Polydispersity in Intensity Correlation Spectroscopy: The Method of Cumulants", The J. Chem. Phys,1972, vol. 57, No. 11, pp. 4814-4820.

(Continued)

*Primary Examiner* — HOA Holly Le
(74) *Attorney, Agent, or Firm* — Lisa P. Fulton (57) ABSTRACT

A composition having pH of 6 or less comprises composite particles dispersed in an aqueous continuous liquid phase. Each composite particle comprises a non-cationic polymer core surrounded by a silica shell consisting essentially of silica particles having a mean particle diameter of 3.2 nanometers or less. The weight ratio of the total amount of the silica in the composition to the total polymer is in a range of 0.2 to 2.2. The composition is useful for making various articles. A method for making the composition is also disclosed.

9 Claims, 1 Drawing Sheet

(51) Int. Cl.
  C09D 5/00    (2006.01)
  C08J 3/12    (2006.01)
  C08K 3/36    (2006.01)
  C08K 9/04    (2006.01)
  C08K 9/06    (2006.01)
  C08K 9/08    (2006.01)
  C08K 9/02    (2006.01)
(52) U.S. Cl.
  CPC .............. *C09D 5/00* (2013.01); *C08K 9/02* (2013.01); *C08K 9/06* (2013.01); *C08K 9/08* (2013.01)
(58) Field of Classification Search
  CPC ... C03C 17/001; C03C 17/007; C03C 17/008; C03C 17/25; C03C 17/30; C03C 2217/42; C03C 2217/478; C03C 2218/11; C03C 2218/32
  See application file for complete search history.

(56) References Cited

U.S. PATENT DOCUMENTS

| | | | | |
|---|---|---|---|---|
| 8,633,263 | B2* | 1/2014 | Jing | ............ C08J 3/215 523/205 |
| 2001/0051213 | A1 | 12/2001 | Schulz | |
| 2002/0090519 | A1 | 7/2002 | Kursawe | |
| 2013/0225760 | A1* | 8/2013 | Jing | ............ C09D 5/028 524/560 |
| 2019/0010341 | A1* | 1/2019 | Jing | ............ C09D 7/70 |

FOREIGN PATENT DOCUMENTS

| | | | |
|---|---|---|---|
| JP | 2001-106791 | 4/2001 | |
| WO | WO 2008-028640 | 2/2008 | |
| WO | WO 2010-114700 | 10/2010 | |
| WO | WO-2010114700 A1 * | 10/2010 | ........... C08J 3/215 |
| WO | WO 2012-045204 | 4/2012 | |

OTHER PUBLICATIONS

International Search report for PCT International Application No. PCT/CN2015/098919 dated Jun. 30, 2016, 5 pages.

Horiba Instruments, A Guidebook to Particle Size Analysis, Jan. 1, 2010, pp. 1-30, <http://www.horiba.com/fileadmin/uploads/Scientific/Documents/PSA/PSA_Guidebook.pdf> [retrieved from the Internet on Aug. 29, 2012].

Webb, "Interpretation of Particle Size by Different Analytical Techniques", Jan. 1, 2009, pp. 1-10, https://www.micromeritics.com/pdf/mas/interpretation%20of%20particle%20size%20by%20different%20techniques.pdf>, [retrieved from the Internet on Aug. 22, 2012].

* cited by examiner

COATING COMPOSITION COMPRISING SILICA-POLYMER CORE-SHELL PARTICLES, METHOD OF MAKING COMPOSITION AND ARTICLE

TECHNICAL FIELD

The present disclosure broadly relates to compositions useful for coating a substrate, methods of making them, and articles made therefrom.

BACKGROUND

There have been many efforts to develop compositions that can be applied to substrates to provide a beneficial protective or functional layer with desirable properties such as one or more of easy cleaning, stain prevention, antireflection, and the like. Many compositions developed for such applications rely on materials (for example, volatile organic solvents) that can present environmental issues and/or involve complex application processes. Further, problems relating to inadequate shelf-life continue to plague product developers of such compositions.

For articles that include a window of transparent material (e.g., glass or plastic) through which light must pass, any reflection or blockage of incident light transmitted through the transparent sheet is generally undesirable. During assembly of such articles, residue from adhesives and/or sealants used in fabrication of the article can build up on the window, leading to reduced light transmission through it. Accordingly, it is desirable that the window be made durable, anti-reflective, stain/soil-resistant (antisoiling), and easy to clean.

SUMMARY

Advantageously, compositions according to the present disclosure provide long lasting useful levels of cleanability, soil-resistance, durability, and/or anti-reflectance properties when applied to substrates having a hard surface. In one preferred embodiment, the substrate comprises a photovoltaic cell. Moreover, the compositions may be formulated to contain little or no volatile organic solvents, are typically easy to apply, and may exhibit extended shelf stability.

In one aspect, the present disclosure provides a composition comprising:

an aqueous continuous liquid phase; and composite particles dispersed in the aqueous continuous liquid phase, each composite particle comprising a non-cationic polymer core surrounded by a silica shell disposed on the polymer core, wherein the shell consists essentially of silica particles having a mean particle diameter of 3.2 nanometers (nm) or less, and wherein the polymer core comprises at least one polymer, wherein the weight ratio of the total amount of the silica in the composition to the total amount of the at least one polymer is in a range of 0.2 to 2.2, and wherein the composition has a pH of 6 or less.

Compositions according to the present disclosure are useful; for example, for making coated articles.

Accordingly, in another aspect, the present disclosure provides a method of making an article, the method comprising applying a composition according to the present disclosure to a surface of a substrate, and at least partially drying the composition. In yet another aspect, the present disclosure provides an article made by the method.

In yet another aspect, the present disclosure provides a method of making a composition comprising steps:

a) providing an aqueous dispersion comprising silica particles and polymer particles to provide an alkaline dispersion having a pH value greater than 7; and b) gradually acidifying the alkaline dispersion such that a major portion of the polymer particles are converted to composite particles thereby providing a composite particle dispersion, each composite particle comprising a non-cationic polymer core surrounded by a shell consisting essentially of silica particles disposed on the polymer core, wherein the polymer core comprises at least one polymer, wherein the silica particles have a mean particle diameter of 3.2 nanometers or less, and wherein the weight ratio of the total amount of the silica particles in the composition to the total amount of the at least one polymer in the composition is in a range of 0.2 to 2.2.

As used herein:

the term "aqueous" means containing at least 5 weight percent of water;

the term "polyurethane" includes any polymeric material that has at least one polyurethane segment; and the term "polyurethane segment" refers to at least two urethane and/or urea groups that are connected by an organic group.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure.

DETAILED DESCRIPTION

Compositions according to the present disclosure comprise an aqueous continuous liquid phase having composite particles dispersed therein.

The aqueous continuous liquid phase preferably comprises at least 5 percent by weight of water; for example, the aqueous continuous liquid phase may comprise at least 50, 60, 70, 80, or 90 percent by weight of water, or more. While the aqueous continuous liquid phase is preferably substantially free of (that is, contains less than 10 percent by weight of based on the total weight of the aqueous continuous liquid phase) organic solvents, especially volatile organic solvents, organic solvents may optionally be included in a minor amount if desired. If present, the organic solvents should preferably be water-miscible, or at least water-soluble in the amounts in which they are used, although this is not a requirement. Examples of organic solvents include acetone and lower molecular weight ethers and/or alcohols such as methanol, ethanol, isopropanol, n-propanol, glycerin, ethylene glycol, triethylene glycol, propylene glycol, ethylene or propylene glycol monomethyl or monoethyl ether, diethylene or dipropylene glycol methyl or ethyl ether, ethylene or propylene glycol dimethyl ether, and triethylene or tripropylene glycol monomethyl or monoethyl ether, n-butanol, isobutanol, sec-butanol, tert-butanol, and methyl acetate.

It will be recognized that some organic solvent (e.g., ethanol or methanol) will typically be generated in situ during hydrolysis of the organosilicates. This amount is not included by the term "added solvent" in the preceding paragraph. In general, this amount, which may be removed if desired, is less than 10 percent by weight, preferably less than 7 percent by weight.

Each of the composite particles comprises a non-cationic polymer core surrounded by a silica shell disposed on the polymer core. As used herein, the term "shell" refers to an assembly of silica particles disposed on and covering (e.g., densely covering) the surface of a polymer core. In some preferred embodiments, the silica particles are nonporous and spherical; however, this is not a requirement.

The silica particles may optionally be covalently bonded one to another in the composition, but this is typically not preferred. However, once applied to a substrate and dried, it is preferred that the silica particles form covalent bonds that link them one to another (e.g., by acid sintering), and optionally to the substrate.

By the term "non-cationic polymer core", it is meant that core is free of polymers having a permanently positively charged group such as, for example, tetraalkylammonium, pyridinium, guanidinium, or quaternary phosphonium. Protonated groups that readily dissociate in water (e.g., in response to the pH) may be included in the polymer core; however, in many embodiments they are not. The polymer core comprises at least one polymer.

The polymer core may comprise any non-cationic polymer, typically one that can be prepared as a latex, more typically as an alkaline pH stable latex. Typically, the polymer core comprises one or more water-insoluble polymers, although this is not a requirement. Exemplary polymers include acrylic polymers, styrenic polymers, vinyl acetate-ethylene copolymers, polyvinyl acetate, styrene-butadiene rubbers, polyurethanes (including urethane-acrylic polymers), polyesters, and polyamides. Preferably, the polymer is a film-forming polymer. The polymer may be thermosetting or thermoplastic. Preferably, the polymer comprises a polyurethane segment as in the case of a polyurethane or a urethane-acrylic polymer (which typically has polyurethane and polyacrylic segments). Suitable polymer latexes and methods for making them are widely known in the art, and many are commercially available. Typically, the particles in the polymer latexes are substantially spherical in shape, although this is not a requirement.

Examples of commercially available polymer latexes include acrylic emulsion polymers available as NEOCRYL A612 and NEOCRYL A1049 from DSM Neoresins, Wilmington, Mass. and 3M FAST TACK 1000NF acrylic emulsion from 3M Company, Saint. Paul, Minn.; aqueous aliphatic polyurethane emulsions available as NEOREZ R-960, NEOREZ R-966, NEOREZ R-967, NEOREZ R-9036, and NEOREZ R-9699 from DSM NeoResins, Inc., Wilmington, Mass.; aqueous anionic polyurethane dispersions available as ESSENTIAL CC4520, ESSENTIAL CC4560, ESSENTIAL R4100, and ESSENTIAL R4188 from Essential Industries, Inc., Merton, Wis.; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; an aqueous anionic, co-solvent free, aliphatic self-crosslinking polyurethane dispersion, available as BAYHYDROL PR240 from Bayer Material Science, LLC of Pittsburgh, Pa.; and a carboxylated styrene-butadiene (SBR) latex emulsion available as ROVENE 5044 from Mallard Creek Polymers, Inc., Charlotte, N.C.

Combinations of polymers may be included in the polymer core. For example, an individual polymer core may comprise two or more polymers. Further, the composition may contain two types of polymer cores, each comprising a different type of polymer, for example, as would be obtained by mixing an acrylic latex and a polyurethane latex.

Optionally, the composition may further comprise one or more water-soluble polymers which may be present in the core (if non-cationic) and/or dissolved or dispersed in the aqueous continuous liquid phase exclusive of the composite particles. Examples include polyvinyl alcohols (e.g., of varying degree of hydrolysis), polyacrylamides, polyvinylpyrrolidone, polyethyleneimine, hydroxyethylcellulose, polyalkylene oxides (e.g., polyethylene oxide, polypropylene oxide), and polyvinyl methyl ether and its copolymers with maleic anhydride. Preferably the water-soluble polymer is free of permanently charged groups.

Useful polymer particle diameters (sizes) include those typical of latexes and other dispersions or emulsions. Typical polymer particle diameters are in a range of from about 5 to 250 nm, more preferably 10 to 70 nm, more preferably 10 to 50 nm, and even more preferably 20 to 50 nm, although this is not a requirement.

The shell consists essentially of silica particles having a mean particle diameter of 3.2 nm or less. That is, the shell may contain addition components (e.g., metal cations), provided that silica particles retain their particulate character in the composition. Preferably, the silica particles have a mean particle diameter of from 1 to 3.2 nm; more preferably 1 to 2 nm. Preferably, the silica particles are monodisperse, with substantially the same size and shape. In some embodiments, the silica particles may be individually bound (e.g., reversibly bound) to the polymer core. In some embodiments, some or all of the silica particles can be bonded to other silica particles (e.g., by acid sintering, multivalent metal ion cross-linking). In cases where the polymer core is burned out, the silica shell may be heat sintered.

Silica particles in aqueous media (sols) are well known in the art and may be synthesized, for example, according to the Stober process via amine/base-catalyzed hydrolysis of a tetraalkoxyorthosilicate such as tetraethoxysilane or tetramethoxyorthosilicate. Exemplary amines/bases include alkylamines having from 1 to 4 carbon atoms (e.g., methylamine, ethylamine, dimethylamine, propylamine, butylamine), alkanolamines (e.g., ethanolamine, propanolamine), and ammonia. Further details are given in the Examples described hereinbelow. See also U.S. Pat. No. 4,806,665 (Jones et al.).

Mean particle diameter can be determined using Dynamic Light Scattering (also known as Photon Correlation Spectroscopy). Various commercial instruments are available. One preferred instrument is available as a ZETASIZER NANO ZS from Malvern Instruments, Malvern, United Kingdom, used according to the manufacturer's instructions and with its accompanying software.

The weight ratio of the total amount of the silica in the composition to the total amount of the at least one polymer in the polymer core is in a range of 0.2 to 2.2, more preferably 0.4 to 2.0, more preferably 0.5 to 1.8, more preferably 0.6 to 1.6, and even more preferably 0.7 to 1.3.

Composite particles according to the present disclosure preferably have an average particle diameter of from 60 to 150 nm, more preferably 60 to 100 nm, although other average particle diameters are also acceptable.

Compositions according to the present disclosure have a pH of 6 or less, preferably 5 or less, and more preferably 4 or less, 3 or less, or even 2 or less. As is known in the art, the pH of aqueous compositions may be adjusted, for example, by addition of acid and/or base.

The composition may have a wide range of non-volatile solids content. For example, it may have a solids content of from 0.1 to 15 percent by weight, or more. Preferably the solids contents is from 2 to 10 percent by weight, more preferably from 3 to 8 percent by weight.

Optionally, the composition may further comprise at least one of an organic orthosilicate or a partially hydrolyzed oligomer thereof. Exemplary organosilicates include, tetramethoxysilane (TMOS) and tetraethoxysilane (TEOS). The organosilicate may be present as a hydrolyzed oligomer as it exists in the composition.

Optionally, but preferably, the composition may further comprise a hydrolyzable organosilane according to Formula I:

$$R^1Si(OR^2)_3 \qquad (I)$$

$R^1$ represents a monovalent organic group, preferably having from 1 to 18 carbon atoms. $R^1$ may include aromatic and/or aliphatic moieties. Preferred the organic groups $R^1$ include alkyl groups having from 1 to 4 carbon atoms (e.g., methyl, ethyl, propyl, butyl), chloromethyl, 3-chloropropyl, epoxyalkyl and epoxyalkyleneoxyalkyl groups having from 1 to 6 carbon atoms (e.g., 3-glycidyl, 3-glycidoxypropyl, 3-glycidoxypropyl-2-yl, 3-glycidoxyethyl, and oxiranyl), and alkenyl groups having from 1 to 6 carbon atoms (e.g., vinyl, allyl, and phenyl). The foregoing organic groups may optionally be substituted by catenary O, S, P, and/or N atoms.

Each $R^2$ independently represents H, an alkyl group having from 1 to 4 carbon atoms, or an acyl group having from 1 to 4 carbon atoms. Exemplary $R^2$ groups include methyl, ethyl, propyl, butyl, acetyl, and propanoyl. Of these, ethyl and methyl are most preferred.

The hydrolyzable organosilane of Formula I is added to the composition with mixing after the composite particles have been formed, and may be present as free material and/or as a reaction product with the composite particles (e.g., on at least a portion of their respective silica particle surfaces). If present, the added hydrolyzable organosilane is preferably added in an amount of 1 to 10 percent by weight, more preferably 4 to 7 percent by weight, of the total weight of the resulting composition. Unexpectedly, it is presently discovered that inclusion of hydrolyzable organosilane as described above increases storage stability of the composition.

In some embodiments, the composition further comprises a metal cation having a positive charge of at least +2 charge (i.e., a polyvalent metal cation). In some embodiments, the charge of the metal cation is at least +3. Exemplary suitable metal cations include those provided by dissolving salts of polyvalent metals such as aluminum (+3), titanium (+4), vanadium (+3, +4, +5), manganese (+2, +3), zinc (+2), and tin (+2, +4) in the aqueous vehicle. In some preferred embodiments these metal cations comprise aluminum (+3) cations). If a polyvalent metal cation is included in the composition, it is preferably present in an amount of from 0.1 to 5 percent by weight, more preferably 0.5 to 3 percent by weight based on the total weight of the composition, although other amounts may also be used.

Compositions according to the present disclosure may optionally include at least one surfactant. The term "surfactant" as used herein describes molecules with hydrophilic (polar) and hydrophobic (non-polar) segments on the same molecule, and which are capable of reducing the surface tension of the composition. Examples of useful surfactants include: anionic surfactants such as sodium dodecylbenzenesulfonate, dioctyl ester of sodium sulfosuccinic acid, polyethoxylated alkyl ($C_{12}$) ether sulfate, ammonium salt, and salts of aliphatic hydrogen sulfates; cationic surfactants such as alkyldimethylbenzylammonium chlorides and ditallowdimethylammonium chloride; nonionic surfactants such as block copolymers of polyethylene glycol and polypropylene glycol, polyoxyethylene (7) lauryl ether, polyoxyethylene (9) lauryl ether, and polyoxyethylene (18) lauryl ether; polysorbate 20 (e.g., TWEEN 20 from surfactants from Croda, Edison, N.J.), polysorbate 80 (e.g., TWEEN 80 from Croda) and amphoteric surfactants such as N-cocoaminopropionic acid. Silicone and fluorochemical surfactants such as those available under the trade designation FLUORAD from 3M Company, St. Paul, Minn., may also be used. If present, the amount of surfactant typically is in an amount of less than about 0.1 percent by weight of the composition, preferably between about 0.003 and 0.05 percent by weight of the composition.

The composition may also optionally contain an antimicrobial agent. Many antimicrobial agents are commercially available. Examples include those available as: Kathon CG or LX available from Rohm and Haas Co., Philadelphia, Pa.; 1,3-dimethylol-5,5-dimethylhydantoin; 2-phenoxyethanol; methyl-p-hydroxybenzoate; propyl-p-hydroxybenzoate; alkyldimethylbenzylammonium chloride; and benzisothiazolinone.

Compositions according to the present disclosure are useful for preparing coatings on substrates, where they may impart one or more useful properties such as stain resistance, antireflection, and/or easy cleaning.

Figure 1:
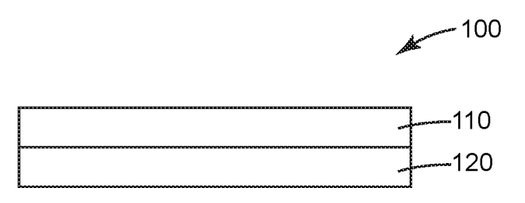
FIG. 1 is a schematic side view of an article 100 made according to the present disclosure.

Compositions according to the present disclosure are useful, for example, for coating a substrate. Referring now to FIG. 1, an article 100 comprises a substrate 120 having a layer 110 disposed thereon. Layer 110 is formed by applying a composition according to the present disclosure to a surface of a substrate and at least partially removing the aqueous continuous liquid phase from the composition.

Suitable substrates may include, for example, glass (for example, windows (including architectural and motor vehicle windows) and optical elements such as, for example, lenses, filters, and mirrors), electronic display windows, solar panels (typically, on solar glass), ceramic (for example, ceramic tile), cement, stone, painted and/or clearcoat surfaces (for example, automobile or truck body or closure panels, boat surfaces, motorcycle parts, truck tractors, snowmobiles, jet skis, off-road vehicles, and tractor trailers), appliances, signage, plastic protective films which are backed with pressure-sensitive adhesives, metal (for example, architectural columns, plumbing fixtures), fiberglass, thermosetting polymers, sheet molding compound, thermoplastics (for example, polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof.

Compositions according to the present disclosure can be prepared by various techniques. In one such technique, an aqueous dispersion of the silica particles is mixed with a polymer latex while maintaining an alkaline pH (preferably a pH of 7 to 10). Simple mixing is generally effective for this step. Next, the composition is acidified with acid thereby causing the silica particles to deposit as a shell (preferably, a monolayer shell) on the surfaces of the polymer latex particles. This deposition of silica particles is preferably reversible by adjusting the pH back above about 7. Typically, the resulting composite particles are particularly stable at low pH values (e.g., a pH of 1 to 4). In an alternative method, an organosilicate (e.g., TMOS or TEOS) and the latex can be mixed together and the mixture hydrolyzed under alkaline conditions (e.g., using ammonia or an amine). Acidification of the hydrolyzed mixture causes the silica particles to deposit as a shell (preferably, a monolayer shell) on the surface of each polymer latex particles as described above.

To achieve shell formation the silica particles should typically be smaller than the polymer core, although this is not a requirement. For example, the mean particle diameter ($D_{50}$) of the polymer core may be on the order of at least 3 times greater than the mean particle diameter ($D_{50}$) of the silica particles. More typically, the mean particle diameter of the polymer core should typically be on the order of at least 5 times, at least 10 times, or even at least 50 times greater than the mean particle diameter of the silica particles.

For typical polymer core sizes, a weight ratio of the silica particles to the polymer latex particles used in manufacture of the composite particles is in a range of from 17:83 (0.2) to 69:31 (2.2), 30:70 (0.4) to 67:33 (2.0), preferably 40:60 (0.7) to 65:35 (1.9), and more preferably 45:55 (0.8) to 60:40 (1.5), although other sizes may also be used. Without wishing to be bound by theory, it is believed that during gradual acidification of such a dispersion of polymer particles (for example, latex particles) and silica particles in the aqueous liquid vehicle, the silica particles deposit on the surface of the polymer latex particles, eventually in sufficient quantity to form a shell (typically at least a monolayer of the silica particles) that serves to stabilize the dispersion and reduce or prevent agglomeration and precipitation of the polymer particles. It is further believed that upon addition of base to raise the pH that the silica particles dissociate from the polymer latex particles and regenerate a mixture of the two types of particles.

Preferably, the silica shell is free of other particulate matter and/or non-spherical silica particles.

In some embodiments, compositions according to the present disclosure are purified at some point in their manufacture to remove ammonium, quaternary ammonium, and/or metal cations (e.g., alkali metal cations such as sodium and potassium) that may be present. This may be done by any suitable method such as, for example, by contacting the composition with an ion exchange (i.e., with protons) resin. If it is desired to include a polyvalent metal cation in the composition, then such purification should be carried out prior to addition of the polyvalent metal cation.

In addition, to facilitate coating, coating compositions according to the present disclosure preferably have a pH of less than 5, more preferably less than 4, and more still preferably less than 4. To facilitate handling, the coating compositions preferably have a pH of at least 1, more preferably at least 2. In some embodiments, for example, those involving an acid sensitive substrate, it may be preferable to adjust the pH to a value of from about 5 to about 7.5, although this may tend to disrupt the core-shell particle structure.

The compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, methoxyacetic acid, formic acid, propionic acid, benzenesulfonic acid, $H_2SO_3$, $H_3PO_4$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. Preferred acids include HCl, $H_2SO_4$, $HNO_3$, and $H_3PO_4$. Combinations of organic and inorganic acids may also be used. Using weaker acids having a $pK_a$ of greater than 5 may not result in a uniform coating having the desirable properties such as transmissivity, cleanability and/or durability.

Compositions according to the present disclosure may be made by any suitable mixing technique. One useful technique includes combining an alkaline polymer latex with an alkaline spherical silica sol of appropriate particle size, and then adjusting the pH to the final desired level.

In some embodiments, the compositions are free of various impurities including nonspherical silica particles, porous silica particles, and added crosslinkers (for example, polyaziridines or orthosilicates). Accordingly, compositions according to the present disclosure may contain less than 0.1 weight percent or less than 0.01 weight percent of acicular silica particles, and, if desired, they may be free of acicular silica particles.

In some embodiments, compositions according to the present disclosure, when coated on a substrate and at least partially dried, provide improved cleanability by way of a reduced tendency to accumulate dirt and other contaminants. By "cleanable" it is meant that compositions according to the present disclosure, when dried and cured, provide a coating which is easier to clean by contacting with flowing water or a water spray to readily displace overlying contamination, thereby removing a substantial portion of the contamination from the coating. The water sheeting effect allows road spray, snow, slush dirt, soap scum, and staining minerals in rainwater and rinse water to substantially sheet out and run off the substrate surface, which significantly reduces the amount and the localized concentration of contaminants that are deposited after the water dries.

In some embodiments, the composition provides an abrasion resistant layer that helps protect the substrate from damage from causes such as scratches, abrasion, and solvents.

The compositions are preferably coated on the article using conventional coating techniques, such as brush, bar, roll, wipe, curtain, rotogravure, spray, or dip coating techniques. For ease and simplicity, a preferred method is to wipe the coating formulation on using a suitable woven or nonwoven cloth, sponge, or foam. Such application materials are preferably acid-resistant and may be hydrophilic or hydrophobic in nature, preferably hydrophilic. Another method to control final thickness and resultant appearance is to apply the coating using any suitable method and, after allowing a portion of the solvent to evaporate, to rinse off excess composition with a stream of water, while the substrate is still fully or substantially wetted with the composition.

Compositions according to the present disclosure are preferably applied to a substrate in a uniform average wet thickness varying from 0.5 to 50 micrometers, and more preferably 1 to 10 micrometer, in order to avoid visible interference color variations in the coating, although other thicknesses may also be used.

The optimal average dry coating thickness is dependent upon the particular composition that is coated, but in general the average thickness of the composition coating thickness is between 0.05 to 5 micrometers, preferably 0.05 to 1 micrometer; for example, as estimated from atomic force microscopy and/or surface profilometry. Above this range, the dry coating thickness variations typically cause optical interference effects, leading to visible iridescence (rainbow effect) of the dried coating which is particularly apparent on darker substrates. Below this range the dry coating thickness may be inadequate to confer sufficient durability for most coatings exposed to environmental wear.

After coating the surface of the substrate, the resultant article is typically dried at ambient or warm temperatures without the need for high temperature heat, radiation or other curing method. Although higher temperature may increase the speed of the drying process, such temperatures are usually not practical or convenient and care must be exercised to avoid damage to the substrate.

In some preferred embodiments, the coatings are heated (e.g., baked) to a sufficiently high temperature (e.g., at least 350 to 750° C.) to cause burn out of the polymer cores, leaving behind the hollow silica shells. Coatings on solar glass (i.e., cover glass affixed to and protecting a photovoltaic cell) resulting from such burn out exhibit excellent antireflective properties and improved light transmission of several percent across the useful 380-1100 nm wavelength range.

Preferably, compositions according to the present disclosure are stable when stored in liquid form; for example, they do not gel, opacify, form precipitated or agglomerated particulates, or otherwise deteriorate significantly.

SELECT EMBODIMENTS OF THE PRESENT DISCLOSURE

In a first embodiment, the present disclosure provides a composition comprising:
an aqueous continuous liquid phase; and
composite particles dispersed in the aqueous continuous liquid phase, each composite particle comprising a non-cationic polymer core surrounded by a silica shell disposed on the polymer core, wherein the shell consists essentially of silica particles having a mean particle diameter of 3.2 nanometers or less, and wherein the polymer core comprises at least one polymer, wherein the weight ratio of the total amount of the silica in the composition to the total amount of the at least one polymer is in a range of 0.2 to 2.2, and
wherein the composition has a pH of 6 or less.

In a second embodiment, the present disclosure provides a composition according to the first embodiment, wherein the weight ratio of the total amount of the silica in the composition to the total amount of the at least one polymer is in a range of 0.4 to 2.0.

In a third embodiment, the present disclosure provides a composition according to the first or second embodiment, wherein the composition further comprises at least one of an organic orthosilicate or a partially hydrolyzed oligomer thereof.

In a fourth embodiment, the present disclosure provides a composition according to any one of the first to third embodiments, wherein the composition further comprises a water-soluble polymer.

In a fifth embodiment, the present disclosure provides a composition according to any one of the first to fourth embodiments, wherein the composition further comprises from 1 to 10 percent by weight of a hydrolyzable silane represented by the formula:

wherein
$R^1$ represents a monovalent organic group; and
each $R^2$ independently represents H, an alkyl group having from 1 to 4 carbon atoms, or an acyl group having from 1 to 4 carbon atoms.

In a sixth embodiment, the present disclosure provides a composition according to any one of the first to fifth embodiments, wherein the composition further comprises at least one metal cation having a charge of at least +2.

In a seventh embodiment, the present disclosure provides a method of making an article, the method comprising applying a composition according to any one of the first to sixth embodiments to a surface of a substrate, and at least partially drying the composition.

In an eighth embodiment, the present disclosure provides a method according to the seventh embodiment, further comprising heating the at least partially dried composition to a temperature sufficient to burn out the polymer cores of at least a portion of the composite particles, leaving behind the corresponding hollow silica shells.

In a ninth embodiment, the present disclosure provides a method according to the seventh embodiment, wherein the substrate is selected from the group consisting of lenses, filters, windshields, electronic illuminated displays, and solar panels.

In a tenth embodiment, the present disclosure provides an article prepared according to the method of any one of the seventh to ninth embodiments.

In an eleventh embodiment, the present disclosure provides a method of making a composition comprising steps:
a) providing an aqueous dispersion comprising silica particles and polymer particles to provide an alkaline dispersion having a pH value greater than 7; and
b) gradually acidifying the alkaline dispersion such that a major portion of the polymer particles are converted to composite particles thereby providing a composite particle dispersion, each composite particle comprising a non-cationic polymer core surrounded by a shell consisting essentially of silica particles disposed on the polymer core, wherein the polymer core comprises at least one polymer, wherein the silica particles have a mean particle diameter of 3.2 nanometers or less, and wherein the weight ratio of the total amount of the silica particles in the composition to the total amount of the at least one polymer in the composition is in a range of 0.2 to 2.2.

In a twelfth embodiment, the present disclosure provides a method according to the eleventh embodiment, further comprising contacting the composition with a protonated cation exchange resin.

In a thirteenth embodiment, the present disclosure provides a method according to the eleventh or twelfth embodiment, wherein the weight ratio of the total amount of the silica in the composition to the total amount of the at least one polymer is in a range of 0.4 to 2.0.

In a fourteenth embodiment, the present disclosure provides a method according to any one of the eleventh to thirteenth embodiments, wherein the aqueous dispersion further comprises at least one of an organic orthosilicate or a partially hydrolyzed oligomer thereof.

In a fifteenth embodiment, the present disclosure provides a method according to any one of the eleventh to fourteenth embodiments, wherein on step b) said acidifying the alkaline dispersion achieves a pH value of less than or equal to 6.

In a sixteenth embodiment, the present disclosure provides a method according to any one of the eleventh to fifteenth embodiments, further comprising adding to the composition from 1 to 10 percent by weight, based on the total combined weight of the composition, of a hydrolyzable silane represented by the formula:

wherein
$R^1$ represents a monovalent organic group; and
each $R^2$ independently represents H, an alkyl group having from 1 to 4 carbon atoms, or an acyl group having from 1 to 4 carbon atoms.

In a seventeenth embodiment, the present disclosure provides a method according to any one of the eleventh to sixteenth embodiments, wherein the composition further comprises a water-soluble polymer.

In an eighteenth embodiment, the present disclosure provides a method according to any one of the eleventh to sixteenth embodiments, wherein the composition further comprises an aluminum cation.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise noted, all chemicals used in the examples can be obtained from general chemical suppliers such as, for example, Sigma-Aldrich Corp., Saint Louis, Mo. In the examples, "wt. %" refers to weight percent, and "mol" refers to mole.

TABLE OF MATERIALS USED IN THE EXAMPLES

| ABBREVIATION | DESCRIPTION | SOURCE |
| --- | --- | --- |
| IE | AMBERLITE IR 120 H sulfonated polystyrene-type cation exchange resin | Alfa Aesar, Ward Hill, Massachusetts |
| N2326 | NALCO 2326 ammonia-stabilized colloidal silica particle dispersion, 16 wt. % solids, mean particle diameter = 5 nm | Nalco Co., Naperville, Illinois |
| R966 | NEOREZ R-966 aliphatic urethane aqueous emulsion, 33 wt. % solids | DSM NeoResins Inc., Wilmington, Massachusetts |
| A612 | NEOCRYL A-612 acrylic resin aqueous emulsion, 30 wt. % solids | |
| A1049 | NEOCRYL A-1049 acrylic aqueous emulsion 39-41 wt. % solids | |
| R5044 | ROVENE 5044 carboxylated styrene - butadiene (SBR) latex emulsion, 50% solids | Mallard Creek Polymers, Inc., Charlotte, North Carolina |
| 3M1000NF | 3M FAST TACK 1000NF acrylic emulsion, 48-52 wt. % solids | 3M Company, St. Paul, Minnesota |
| PET | MELINEX 618 super clear polyester film, 50 microns thickness | E. I. du Pont de Nemours & Co., Wilmington, Delaware |

Tetramethoxysilane (TMOS) and tetraethoxysilane (TEOS) were purchased from Alfa Aesar, Ward Hill, Mass.

3-Glycidoxypropyltrimethoxysilane and (3-acryloxypropyl)trimethoxysilane were purchased from Gelest Inc., Tullytown, Pa.

Ammonium hydroxide solution, nitric acid, phosphoric acid, and acetic acid were purchased from EMD Chemicals Inc., Gibbstown, N.J.

n-Butylamine, 3-amino-1-propanol, aluminum nitrate nonahydrate, zinc acetate dehydrate, and zirconyl chloride octahydrate were purchased from Sigma-Aldrich Co., Saint Louis, Mo.

Polyvinyl alcohol (PVA) resin, having an average molecular weight of 20000 g/mol, was obtained from Marubeni Specialty Chemicals Inc., White Plains, N.Y., and was dissolved in deionized water to obtain a 5 wt. % aqueous solution before use.

Polyvinylpyrrolidone (PVP) resins were purchased from TCI America, Portland, Oreg. PVP having an MW range from 40K-360K was dissolved in DI water to obtain 5 wt. % aqueous solution before use. PVP (K 90) had a number average molecular weight of 360,000 g/mol and PVP (K 70) had a number average molecular weight of 220,000 g/mol.

Regular glass slides were obtained from VWR international, West Chester, Pa.

Solar glass substrate, Solite Glass, was obtained by CSG Holding Co. Ltd., China. These glass slides were pretreated by gentle scrubbing with ALCONOX cleanser from VWR International, and subsequently washed thoroughly with deionized (DI) water before use.

Aluminum nitrate aqueous solution was prepared by dissolving $Al(NO_3)_3 \cdot 9H_2O$ solid into water to obtain a 20 wt. % solution prior to use.

Zinc acetate aqueous solution was prepared by dissolving $Zn(O_2CCH_3)_2 \cdot 2H_2O$ solid in water to obtain a 20 wt. % solution prior to use.

Zirconyl chloride octahydrate aqueous solution was prepared by dissolving $ZrOCl_2 \cdot 8H_2O$ solid into water to obtain a 20 wt. % solution prior to use.

Methods:

Method for Preparing Colloidal Silica Particle Dispersions

In an 8-oz (237 ml) glass jar, 88 grams (g) of DI water and 2 g of ammonium hydroxide solution (28-30%) was mixed homogenously, then 10 g of TEOS was added. The mixture was vigorously stirred for 1-2 hrs until it become a homogenous clear solution. The final solution had a pH of 10.4±0.2.

Alternatively, colloidal silica particle dispersions were prepared by using n-butylamine or 3-amino-1-propanol instead of ammonium hydroxide solution in a similar manner to that described above. The final solutions were clear, with pH values in a range of 9-11.

Specific conditions are indicated reported hereinbelow.

Method of Preparing Composite Particle Dispersions—Method I

Into an 8-oz (237 ml) container was placed 45 g of a colloidal silica particle dispersion, prepared as described above, and 4.5 g of R966 latex while the solution was stirred. Then 50.5 grams of DI water was added to dilute the solution. Finally, $HNO_3$ or acetic acid was added dropwise to adjust the solution pH value to 2-4 to obtain the composite particle dispersion having a weight ratio of silica:R966 (i.e., polymer latex)=46.4:53.6. After preparing the composite particle dispersion, 0.5-1.0 gram of 3-glycidoxypropyltrimethoxysilane was added into the composite particle dispersion and the solution was stirred for at least 30 minutes.

In the same manner, composite particle dispersions with different ratios of silica:polymer latex were prepared by adjusting the amounts of colloidal silica particle dispersion and polymer latex.

In some cases, after preparing the composite particle dispersion, 5-10 grams of aluminum nitrate aqueous solution (20 wt. % $Al(NO_3)_3.9H_2O$), zinc acetate aqueous solution (20 wt. % $Zn(O_2CCH_3)_2(H_2O)_2$) or zirconyl chloride aqueous solution (20 wt. % $ZrOCl_2.8H_2O$) was added into the solution before use.

In some cases, 0.5-4 grams of PVP (5 wt. % in water) or PVA (5 wt. % in water) was mixed with the composite particle dispersions.

The exact process used and the composition of the composite particle dispersions for each Example and Comparative Example are reported hereinbelow.

Method of Preparing Composite Particle Dispersions—Method II

Into an 8-oz (236.5 ml) container was placed 75 g of colloidal silica particle dispersion prepared as described above, and 7.5 g of R966 latex while the solution was stirred. Then 17.5 g of DI water was added to dilute the solution. To the mixed solution was added 15-20 g of IE ion-exchange resin, and the solution was stirred for 10-20 min until the pH dropped to 4-5. The ion-exchange resin was removed by filtration. Finally, $HNO_3$ was added to adjust the solution pH value to 2-4 to obtain the composite particle dispersion having a ratio of silica:R966=46.4:53.6. After preparing the composite particle dispersion, 0.5-1.0 gram of 3-glycidoxypropyltrimethoxysilane was added into the composite particle dispersion and the solution was stirred for at least 30 minutes.

In the same manner, composite particle dispersions with different ratios of silica:polymer latex were prepared by adjusting the amounts of colloidal silica and polymer latex.

In some cases, after preparing the composite particle dispersion, 5-10 grams of aluminum nitrate aqueous solution (20 wt. % $Al(NO_3)_3.9H_2O$), zinc acetate aqueous solution (20 wt. % $Zn(O_2CCH_2)_2.2(H_2O)$) or zirconyl chloride aqueous solution (20 wt. % $ZrOCl_2\ 8H_2O$) was added into the solution before use.

In some cases, 0.5-4 grams of PVP (5 wt. % in water) or PVA (5 wt. % in water) was mixed with the composite particle dispersions.

Method of Preparing Composite Particle Dispersions—Method III

Into an 8-oz (237 ml) container was added 83 g of DI water and 7.5 g of R966 latex. To the solution was added 2.0 grams 28-30% aqueous ammonia (or 1.0 gram n-butylamine/3-amino-1-propanol as indicated). The solution was stirred and subsequently was added 7.5 g TEOS. The solution was stirred for 6-16 hours at room temperature. After hydrolysis, the pH value of the mixed solution was adjusted to 2-4 with nitric acid or acetic acid to obtain the composite particle dispersion having a ratio of R966:silica=53.6:46.4. After preparing the composite particle dispersion, 0.5-1.0 gram of 3-glycidoxypropyltrimethoxysilane was added into the composite particle dispersion and the solution was stirred for at least 30 minutes.

In some cases, after preparing the composite particle dispersion, 5-10 grams of aluminum nitrate aqueous solution (20 wt. % $Al(NO_3)_3.9H_2O$), zinc acetate aqueous solution (20 wt. % $Zn(O_2CCH_2)_2.2(H_2O)$) or zirconyl chloride aqueous solution (20 wt. % $ZrOCl_2\ 8H_2O$) was added into the solution before use.

In some cases, 0.5-4 grams of PVP (5 wt. % in water) or PVA (5 wt. % in water) was mixed with the composite particle dispersions.

Method of Preparing Composite Particle Dispersions—Method IV

Into an 8-oz (237 ml) container was added 83 g of DI water and 7.5 g of R966 latex. To the solution was added 2.0 g of 28-30% aqueous ammonia (or 1.0 gram n-butylamine/3-amino-1-propanol as indicated). The solution was stirred and subsequently was added 7.5 gram TEOS. The solution was stirred for 6-12 hours at room temperature. After hydrolysis, to the mixed solution was added 15-20 g of IE ion-exchange resin, and the solution was stirred for 10-20 min. The ion-exchange resin was removed by filtration and the solution pH was about 4-5. Finally, $HNO_3$ was added to adjust the solution pH value to 2-4 to obtain the composite particle dispersion having a ratio of R966:silica=53.6:46.4. After preparing the composite particle dispersion, 0.5-1.0 g of 3-glycidoxypropyltrimethoxysilane was added into the composite particle dispersion and the solution was stirred for at least 30 minutes.

In some cases, after preparing the composite particle dispersion, 5-10 grams of aluminum nitrate aqueous solution (20 wt. % $Al(NO_3)_3.9H_2O$), zinc acetate aqueous solution (20 wt. % $Zn(O_2CCH_2)_2.2(H_2O)$) or zirconyl chloride aqueous solution (20 wt. % $ZrOCl_2\ 8H_2O$) was added into the solution before use.

In some cases, 0.5-4 grams of PVP (5 wt. % in water) or PVA (5 wt. % in water) was mixed with the composite particle dispersions.

Method of Preparing Composite Particle Dispersion—Method V

Into an 8-oz (237 ml) container was placed 5.0 g of R966 latex, 86.67 g of DI water, and 8.33 g of TEOS or TMOS while the solution was stirred. The pH of the solution was adjusted using $HNO_3$ or an ion exchange resin to acidic or neutral range (pH 4-8). The amount of tetraalkylorthosilicate and polymer latex to use was determined based on the desired wt. ratio of silica:polymer latex particles in the resulting dispersion. Finally, hydrolysis reaction was allowed to run for some time to obtain the composite particle dispersion.

Method for Coating PET Film and Glass Slide Substrates

Coated samples were prepared by coating the composite particle dispersion solutions for Examples and Comparative Examples described below using a Meyer bar (wire wound rod) or a dip coater. Unless stated otherwise, the coated samples were subjected to 100-140° C. for 5-10 minutes after coating.

Method for Determining Particle Diameter

Dynamic Light Scattering (DLS) was applied for particle size analysis with a Zetasizer Nano ZS at room temperature. For colloidal silica particles and functional silica particles, the samples were prepared by diluting with pH~10 ammonia solution or 3-amino-1-propanol solution. For composite particles, the samples were diluted with pH~2 $HNO_3$ solution containing 5% ethanol. The test conditions are reported below.

Instrument Malvern ZetaSizer Nano ZS
Standard Material: $SiO_2$ (R.I. 1.460_0.100 i)
operating Dispersant: $H_2O$/Aqueous solution (R.I. 1.330)
procedure Viscosity: 1.0031 cP at 20° C.
    Cuvette: Disposable Sizing Cuvette DTS0012
    Measurement: Automatic settings, 173° Backscatter measurement angle, three measurements per cell, automatic attenuation, automatic position and general purpose analysis model Duke Scientific Standard: 60 nm, Lot #43288

The Z-average diameter was calculated by the methods of cumulants as described by Koppel, D. E. in "Analysis of Macromolecular Polydispersity in Intensity Correlation Spectroscopy: The Method of Cumulants" *J. Chem. Phys.* (1972), 57 (11), pp. 4814-4820. The "Z-average diameter" is the intensity weighted harmonic mean diameter. After determining the Z-average diameter, the silica particle diameter (size) was normalized based on calculated the Z-average diameter for a commercially available silica nanoparticle dispersion (i.e., N2326), which has an average particle diameter of 5 nm.

Method for Static Water Contact Angle (SWCA) Measurement

Static water contact angle measurements were performed on dried (coated) samples using DI water obtained from Millipore Corp., Billerica, Mass. The contact angle analyzer used was a VCA Optima video contact angle analyzer from AST Products Inc., Billerica, Mass. The static contact angle was measured on a sessile drop (5 μL), 30 sec after deposition. The values reported are the average of at least 3 separate measurements.

Method for Transmission, Haze and Gloss Measurement

Total transmission and haze measurements were conducted using a HAZE-GUARD PLUS haze meter purchased from BYK-Gardner USA, Columbia, Md. Gloss measurement was conducted on MICRO-TRI-GLOSS meter purchased from BYK-Gardner USA, Columbia, Md. The values reported are the average of three individual data points.

Method for Soil-Resistance (Carpet Soil) Measurement

Carpet soil mixture (80 g) was combined with mixing beads (1600 g) at a 20:1 wt.:wt. ratio using a paint shaker for 5 minutes in a gallon-sized (about 3.79 liter) can. The carpet soil contained 38.4 weight percent peat moss blend, 17 wt. % gray Portland cement, 17 wt. % Dixie clay, 17 wt. % filter gel, 1.8 wt. % carbon black, and 8.8 weight percent mineral oil.

Approximately 200 grams portions of soil mixtures were placed into small cans, and coated Example and Comparative Example samples on PET film and glass slides were placed (one sample per can) into cans so that the samples were totally covered. The immersed samples were shaken for 1 minute using a lab shake after which they were removed, and tapped on a hard surface about three times to remove the loosely adhered dirt. The total transmission, gloss and haze of each sample was measured before and after testing by using the methods described above.

Method for Dip Coating and Tempering

In order to obtain single-side coated Solite Glass substrate, the uncoated side was masked with a piece of tape to prevent the coating solution wetting on the surface. Then the substrate was dipped in a coating solution prepared according to the Examples and Comparative Examples described below. After pulling out of the coating solutions, the tapes were carefully removed. The coated samples were dried at room temperature before subjected to a tempering process at 700-750° C. for 1.5~2.5 minutes, and then cooled to room temperature.

Method for Lambda Transmission Measurements

The transmission spectra of blank and coated samples were measured with a Lambda 1050 Perkin-Elmer spectrophotometer from 380 to 1100 nm. The enhancement of transmission by the AR coatings was evaluated by comparing the average difference between spectra for coated Example and Comparative Example samples and blank spectra in the 380~1100 nm range ($\Delta T_{380\sim1100}$) and are reported below.

Method for Salt Bath Test and Linear Taber Abrasion Test

The coated Example and Comparative Example samples were immersed in a 5 wt. % aqueous NaCl bath for a week, then cleaned with DI water. Those samples were allowed to air dry before transmission and mechanical property measurements. Linear Taber abrasion tests were carried out by using crock cloth patches with 1140 g/cm$^2$ pressure for 400 cycles (using a Model 5750 Taber Abraser, available from Taber Industries, North Tonawanda, N.Y.) on coated areas. Then the tested samples were rinse with DI water for 10 sec to remove the debris from abrasion, and dried. Transmission data were measured after abrasion test, water rinse and drying.

Comparative Examples CEA-CEJ

Comparative Examples CEA-CEJ were prepared by following the procedure described in the Method for Preparing of Colloidal Silica Particle Dispersions-Method V described above. The purpose is to examine the conventional hydrolysis of tetraalkylorthosilicate at acidic or neutral pH conditions (exemplified by TEOS or TMOS) along with polymer latex particles. The tetraalkylorthosilicate, type of polymer latex particles, weight ratio of silica precursor: polymer latex particles, hydrolysis time, pH of the reaction mixture were varied as shown in Table 1. For Comparative Example F, a 5 wt. % solution of PVP (K70) in water was added to the reaction mixture to result in 10 wt. % PVP with respect to the amount of polymer latex.

It was noted that conventional hydrolysis of tetraalkylorthosilicate at acidic or neutral pH conditions (exemplified by TEOS or TMOS) along with polymer latex particles caused gel or precipitation is shown under "Observation" column in Table 1, below. It was concluded that simply using colloidal silica precursors (TEOS or TMOS) to assemble on polymer latex particles to form composite particles would not work.

TABLE 1

| COMPARATIVE EXAMPLE | SILICA PRECURSOR | POLYMER LATEX | SILICA PRECURSOR:POLYMER LATEX, wt.:wt. | WT. % IN SOLUTION | pH (ACID USED) | HYDROLYSIS TIME (HR) | OBSERVATION |
|---|---|---|---|---|---|---|---|
| CEA | none | R966 | 0:100 | 5% in H$_2$O | 6 (HNO$_3$) | N/A | Precipitate |
| CEB | none | R966 | 0:100 | 5% in H$_2$O | 7.5 (IE) | N/A | Precipitate |
| CEC | TEOS | R966 | 83.3:16.7 | 5% in H$_2$O | 4 (HNO$_3$) | N/A | Precipitate |
| CED | TEOS | R966 | 83.3:16.7 | 5% in H$_2$O/ethanol (7/3) | 4 (HNO$_3$) | N/A | Precipitate |
| CEE | TEOS | R966 | 83.3:16.7 | 5% in H$_2$O/ethanol (5/5) | 4 (HNO$_3$) | N/A | Precipitate |

TABLE 1-continued

| COMPARATIVE EXAMPLE | SILICA PRECURSOR | POLYMER LATEX | SILICA PRE-CURSOR:POLY-MER LATEX, wt.:wt. | WT. % IN SOLUTION | pH (ACID USED) | HYDROLYSIS TIME (HR) | OBSERVATION |
|---|---|---|---|---|---|---|---|
| CEF | TEOS | R966 + 10% PVP | 83.3:16.7 | 5% in $H_2O$ | 4 ($HNO_3$) | N/A | Precipitate |
| CEG | TEOS | R966 | 83.3:16.7 | 5% in $H_2O$ | 7-8 | 14 | Precipitate |
| CEH | TMOS | R966 | 83.3:16.7 | 5% in $H_2O$ | 7-8 | 2 | Gel |
| CEI | TMOS | A612 | 83.3:16.7 | 5% in $H_2O$ | 7-8 | 2 | Gel |
| CEJ | TEOS | A612 | 83.3:16.7 | 5% in $H_2O$ | 7-8 | 2 | Gel |

Preparative Examples PE1-PE5 and Comparative Example CEK

Preparative Examples PE1-PE5 were prepared by following the procedure described in the Method for Preparing of Colloidal Silica Particle Dispersions described above. The type of base used was varied as reported in Table 2. The resulting colloidal silica particles were analyzed for their particle diameter using DLS as described in Method for Determining Particle Diameter described above.

Comparative Example CEK was N2326, a commercially available colloidal silica particle dispersion stabilized by ammonia. The average diameter of N2326 is 5 nm. The DLS cumulate fitting results (Z-Average diameter) for Comparative Example CEK (i.e., N2326) was 13.73 nm due to solvation layer around particles. Therefore, after determining the Z-Average diameter values for Preparative Examples PE1-PE5 silica particles, the silica particle diameter was normalized based on calculated Z-Average diameter values for Comparative Example K silica nanoparticle dispersion (i.e., N2326) to determine their normalized particle diameters. The normalized particle diameter of PE1-PE5 colloidal silica particle dispersions determined in this manner are reported in Table 2, below, wherein the abbreviation PDI refers to the polydispersity index.

Method I or II. The Examples that were prepared by Method of Preparing Composite Particle Dispersions—Method I and acidified to pH 2-4 using nitric acid were further denoted as "A", while those acidified using acetic acid were further denoted as "B". The Examples that were prepared by Method of Preparing Composite Particle Dispersions—Method II and acidified to pH 2-4 using ion exchange resin are further denoted as "C".

Examples 1A-8C were run using colloidal silica particle dispersions from Preparative Example PE4 and the type and the amount (i.e., the wt. % silica:polymer latex) of polymer latex were varied as reported in Table 3, wherein the abbreviation PDI refers to the polydispersity index.

Examples 9A-15CD were run in the same manner as Examples 1A-8C, except that they further included PVA or PVP. The amount of PVA or PVP added are reported in Table 3, below as wt. % of polymer latex. Examples that are further denoted as "D" included a further addition of 5 grams of 20 wt. % of $Al(NO_3)_3 \cdot 9H_2O$ salt solution prior to use.

Table 3, below, summarizes the compositions of the Examples 1A-15CD and Comparative Examples CEL-CES and the cumulative fitting results for the resulting composite particles determined using dynamic light scattering (DLS) as

TABLE 2

| EXAMPLE | SILICA PRECURSOR | BASE | AMOUNT OF BASE, g | Z-AVERAGE DIAMETER, nm | PDI | NORMALIZED PARTICLE DIAMETER, nm |
|---|---|---|---|---|---|---|
| CEK | N2326 | — | — | 13.73 | 0.171 | 5.00 |
| PE1 | TEOS | $NH_3 \cdot H_2O$ (28-30%) | 2 | 6.89 | 0.362 | 2.51 |
| PE2 | TEOS | butylamine | 1 | 4.85 | 0.271 | 1.77 |
| PE3 | TEOS | 3-amino-1-propanol | 0.5 | 4.74 | 0.284 | 1.73 |
| PE4 | TEOS | 3-amino-1-propanol | 1 | 4.03 | 0.230 | 1.47 |
| PE5 | TEOS | 3-amino-1-propanol | 1.5 | 4.00 | 0.265 | 1.46 |

Examples 1A-15CD and Comparative Examples CEL-CES

Comparative Examples CEL-CES were commercially available polymer latex dispersions without colloidal silica particles as indicated in Table 3, below.

Examples 1A-15CD were prepared by following the Method of Preparing Composite Particle Dispersions— described in Method for Determining Particle Diameter described above. In Table 3: * indicates multiple peaks; [a] indicates that PVA or PVP (K70) solution was mixed after acidification; [b] indicates that PVP (K70) solution was mixed with R966 prior to acidification; [c] indicates that PVP (K70) solution was mixed with colloidal silica particle dispersion prior to acidification.

TABLE 3

| EXAMPLE | POLYMER LATEX | RATIO OF SILICA:LATEX, wt.:wt. | pH | Z-AVERAGE DIAMETER, nm | PDI |
|---|---|---|---|---|---|
| CEL | R966 | 0:100 | 9.5 | 52.02 | 0.099 |
| CEM | A612 | 0:100 | 9.5 | 124.3 | 0.021 |
| CEN | A1049 | 0:100 | 9.5 | 141.7 | 0.042 |
| CEO | 3M1000NF | 0:100 | 5.5 | 146.0 | 0.005 |
| CEP | R5044 | 0:100 | 7.5 | 177.9 | 0.010 |
| CEQ | PVP | 0:100 | 10 | 47.36 | 0.228 |
| CER | R966 + 2.5% PVP | 0:100 | 10 | 53.53 | 0.109 |
| CES | R966 + 5% PVP | 0:100 | 10 | 55.50 | 0.121 |
| 1A | R966 | 46.4:53.6 | 2 | 129.5 | 0.162 |
| 1B | R966 | 46.4:53.6 | 4 | 124.1 | 0.177 |
| 1C | R966 | 46.4:53.6 | 2 | 73.89 | 0.091 |
| 2A | R966 | 53.6:46.4 | 2 | 109.2 | 0.131 |
| 2B | R966 | 53.6:46.4 | 4 | 121.8 | 0.229 |
| 2C | R966 | 53.6:46.4 | 2 | 74.54 | 0.114 |
| 3A | R966 | 59.0:41.0 | 2 | 92.95 | 0.104 |
| 3B | R966 | 59.0:41.0 | 4 | 115.3 | 0.175 |
| 3C | R966 | 59.0:41.0 | 2 | 71.51 | 0.097 |
| 4A | R966 | 63.4:36.6 | 2 | 90.28 | 0.071 |
| 4B | R966 | 63.4:36.6 | 4 | 115.5 | 0.223 |
| 4C | R966 | 63.4:36.6 | 2 | 73.40 | 0.078 |
| 5A | A612 | 59.0:41.0 | 2 | 170.5 | 0.106 |
| 5B | A612 | 59.0:41.0 | 4 | precipitate | |
| 5C | A612 | 59.0:41.0 | 2 | 169.6 | 0.046 |
| 6A | A1049 | 59.0:41.0 | 2 | 245.6 | 0.176 |
| 6B | A1049 | 59.0:41.0 | 4 | 168.9 | 0.017 |
| 6C | A1049 | 59.0:41.0 | 2 | 204.0 | 0.126 |
| 7A | 3M1000NF | 59.0:41.0 | 2 | 227.4 | 0.065 |
| 7B | 3M1000NF | 59.0:41.0 | 4 | 195.3 | 0.025 |
| 7C | 3M1000NF | 59.0:41.0 | 2 | 174.3 | 0.018 |
| 8A | R5044 | 59.0:41.0 | 2 | 273.6 | 0.122 |
| 8B | R5044 | 59.0:41.0 | 4 | 231.1 | 0.016 |
| 8C | R5044 | 59.0:41.0 | 2 | 218.0 | 0.025 |
| 9C | R966 + 2.5% PVA$^a$ | 59.0:41.0 | 2 | 91.29 | 0.101 |
| 9CD | R966 + 2.5% PVA$^a$ | 59.0:41.0 | 2 | 89.55 | 0.095 |
| 10C | R966 + 5% PVA$^a$ | 59.0:41.0 | 2 | 92.07 | 0.073 |
| 10CD | R966 + 5% PVA$^a$ | 59.0:41.0 | 2 | 88.90 | 0.119 |
| 11C | R966 + 7.5% PVA$^a$ | 59.0:41.0 | 2 | 91.04 | 0.114 |
| 11CD | R966 + 7.5% PVA$^a$ | 59.0:41.0 | 2 | 91.61 | 0.048 |
| 12C | R966 + 10% PVA$^a$ | 59.0:41.0 | 2 | 95.08 | 0.092 |
| 12CD | R966 + 10% PVA$^a$ | 59.0:41.0 | 2 | 90.93 | 0.045 |
| 13C | R966 + 5% PVP$^a$ | 59.0:41.0 | 2 | 146.7* | 0.576 |
| 14A | R966 + 5% PVP$^b$ | 59.0:41.0 | 2 | 658* | 1.000 |
| 14C | R966 + 5% PVP$^b$ | 59.0:41.0 | 2 | 90.56 | 0.256 |
| 14CD | R966 + 5% PVP$^b$ | 59.0:41.0 | 2 | 316* | 1.000 |
| 15A | R966 + 5% PVP$^c$ | 59.0:41.0 | 2 | 384.8* | 0.346 |
| 15C | R966 + 5% PVP$^c$ | 59.0:41.0 | 2 | 104.5 | 0.219 |
| 15CD | R966 + 5% PVP$^c$ | 59.0:41.0 | 2 | 139.0* | 0.350 |

Examples 16A-17C and Comparative Examples CET-CEU

Comparative Examples CET and CEU were mixture of colloidal silica particle dispersion and polymer latex with no further treatment (i.e., no acidification). The composition and the cumulative fitting results for the Comparative Examples CET and CEU composite particles are reported in Table 4, below.

Examples 16A-17C were the composite particles made from acidification of colloidal silica particle dispersion and polymer latex through self-assembly process. The composition, acidification (to pH 2) method and the cumulative fitting results for the composite particles for Examples 16A-17C are reported in Table 4, below.

To demonstrate the reversibility nature of the composite particles and process of this disclosure, Example 16A-17C dispersions (having pH of 2) were titrated with ammonia to a pH of 10, and the cumulative fitting results for the resulting composite particles were measured and reported in Table 4, wherein the abbreviation PDI refers to the polydispersity index.

From a comparison of the Z-Average diameter values for Comparative Example T and Example 16A or 16C it was concluded that the acidification to pH 2 led to the formation of composites as the Z-Average diameter increased. However, when Example 16A and 16C samples were titrated with ammonia to pH 10, the Z-average diameter values decreased indicating that the composite particles dissociated.

Similarly, from a comparison of Z-Average values of Comparative Example CEU and Example 17A or 17C, before and after titration to pH of 10 using ammonia confirms the reversibility of the composite particles and process of this disclosure.

In Table 4, below: * indicates multiple peaks; $^a$ indicates that the PVP (K70) solution was mixed with colloidal silica particle dispersion prior to acidification.

TABLE 4

| EXAMPLE | COMPOSITION | RATIO OF SILICA:LATEX, wt.:wt. | PROCESS | pH | Z-AVERAGE DIAMETER, NM | PDI |
|---|---|---|---|---|---|---|
| GET | PE4 + R966 | 59.0:41.0 | mixing | 10 | 60.74 | 0.079 |
| 16A | PE4 + R966 | 59.0:41.0 | HNO$_3$ | 2 | 79.24 | 0.084 |
| 16A + ammonia | PE4 + R966 | 59.0:41.0 | HNO$_3$, then add ammonia | 10 | 59.05 | 0.071 |
| 16C | PE4 + R966 | 59.0:41.0 | IE | 2 | 73.87 | 0.073 |
| 16C + ammonia | PE4 + R966 | 59.0:41.0 | IE, then add ammonia | 10 | 57.58 | 0.093 |
| CEU | PE4 + R966 + 5% PVP[a] | 59.0:41.0 | mixing | 10 | 60.87 | 0.027 |
| 17A | PE4 + R966 + 5% PVP[a] | 59.0:41.0 | HNO$_3$ | 2 | 3175 | 0.072 |
| 17A + ammonia | PE4 + R966 + 5% PVP[a] | 59.0:41.0 | HNO$_3$, then add ammonia | 10 | 61.02 | 0.049 |
| 17C | PE4 + R966 + 5% PVP[a] | 59.0:41.0 | IE | 2 | 3458* | 0.105 |
| 17C + ammonia | PE4 + R966 + 5% PVP[a] | 59.0:41.0 | IE, then add ammonia | 10 | 56.60 | 0.061 |

Examples 18A-18P and Comparative Examples CEV-CEY

Comparative Examples CEV-CEY were bare PET films and bare glass slides, respectively.

Various composite particle dispersions prepared in Examples described above were coated on PET films and glass slides using a Meyer bar (No. 3, nominal wet thickness=6.86 microns), and then cured by drying at room temperature for 5-10 minutes, then placing in an oven at 120° C. for another 5-10 minutes before testing. The SWCA of the coated and cured samples were measured using the Method for Static Water Contact Angle (SWCA) Measurement described above. The SWCA data for each Example 18A-18P sample and Comparative Examples CEV-CEY are reported in Table 5.

The transmission, haze and gloss were measured before and after exposing them to carpet soil as described in Method for Soil-Resistance (Carpet Soil) Measurement, and are reported in Table 5.

Examples 19A-19T

Various composite particle dispersions prepared in Examples described above were dip-coated on solar glass samples, dried at room temperature for 5-10 minutes and then tempered as described in Method for Dip Coating and Tempering.

Composite particle dispersions 1CE and 1CF were prepared in the same manner as described for 1C above, except that 1.75 g of 20 wt. % of Zn(O$_2$CCH$_3$)$_2$.2H$_2$O solution for 6CE and 1.75 g of 20 wt. % ZrOCl$_2$ 8H$_2$O solution for 6CF was added into solution prior to coating.

Lambda transmission measurements were completed as described in Method for Lambda Transmission Measurements, and the data is reported in Table 6.

Samples made from composite particle dispersions 3C and 3CD, were further tested according to the Method for Salt Bath Test and Linear Taber Abrasion Test to demonstrate the mechanical durability of the coating samples. The obtained data is reported in Table 6, below, wherein [a]

TABLE 5

| | | | BEFORE SOILING | | | | AFTER SOILING | | | |
|---|---|---|---|---|---|---|---|---|---|---|
| EXAMPLE | DESCRIPTION | SWCA, degrees | T % | H % | 20° Gloss | 60° Gloss | T % | H % | 20° Gloss | 60° Gloss |
| CEV | CEV (bare PET) | 71.4 | 90.0 | 1.19 | 200 | 176 | 31.7 | 86.8 | 19.9 | 4.4 |
| 18A | 1A on PET | 67.8 | 96.0 | 0.72 | 85.8 | 120 | 71.2 | 51.7 | 35 | 30.5 |
| 18B | 1C on PET | 54.8 | 95.6 | 0.61 | 90.2 | 122 | 65.6 | 58.3 | 20.2 | 23.6 |
| 18C | 2A on PET | 62.9 | 96.1 | 0.59 | 84 | 123 | 71.2 | 60.6 | 24.9 | 16.7 |
| 18D | 2C on PET | 48.6 | 95.9 | 0.61 | 90.1 | 133 | 73 | 57.1 | 40.6 | 34.4 |
| 18E | 3A on PET | 60.8 | 96.0 | 0.55 | 85.6 | 131 | 69.7 | 58.1 | 34.3 | 25.7 |
| 18F | 3C on PET | 44.7 | 96.1 | 0.50 | 96.9 | 138 | 70.1 | 58.7 | 39.5 | 27.8 |
| 18G | 4A on PET | 62.3 | 96.3 | 0.52 | 100 | 141 | 68.6 | 58.8 | 39 | 33.4 |
| 18H | 4C on PET | 38.2 | 95.9 | 0.57 | 105 | 141 | 74.5 | 55.4 | 27.8 | 14.4 |
| 18I | 14A on PET | 58.6 | 94.3 | 1.09 | 109 | 146 | 81.7 | 24 | 66.2 | 75.9 |
| 18J | 14C on PET | 51.2 | 91.6 | 1.63 | 120 | 156 | 77.7 | 22.5 | 109 | 78.4 |
| 18K | 14CD on PET | 50.8 | 94.5 | 1.14 | 102 | 144 | 83.5 | 22.9 | 49 | 65.4 |
| CEY | CEY (bare glass) | 18.9 | 93.0 | 2.26 | 164 | 151 | 75.1 | 50.9 | 61.6 | 29.4 |
| 18L | 3A on glass | 38.6 | 94.8 | 1.39 | 124 | 137 | 72.7 | 56.2 | 41.3 | 21.6 |
| 18M | 3C on glass | 28.0 | 94.2 | 0.23 | 141 | 148 | 82.7 | 35.3 | 85.9 | 62.5 |
| 18N | 14A on glass | 38.1 | 94.5 | 4.88 | 91.2 | 119 | 88.6 | 16.8 | 72.5 | 73.2 |
| 18O | 14C on glass | 49.8 | 94.3 | 0.43 | 137 | 148 | 81.3 | 40.5 | 67.2 | 43.9 |
| 18P | 14CD on glass | 37.0 | 93.8 | 2.56 | 108 | 129 | 86.4 | 26.2 | 100 | 115 | indicates that PVP (K90) solution was used to prepare composite particle dispersion, and $^b$ indicates that PVP (K70) solution was used to prepare composite particle dispersion

TABLE 6

| EXAMPLE | COMPOSITE PARTICLE DISPERSION | $\Delta T_{380-1100}$, % | SALT BATH (1 week) | LINEAR ABRASION |
|---|---|---|---|---|
| 19A | 1AD | 2.70 | | |
| 19B | 1CD | 2.72 | | |
| 19C | 1CE | 2.72 | | |
| 19D | 1CF | 2.24 | | |
| 19E | 2AD | 2.62 | | |
| 19F | 2CD | 2.67 | | |
| 19G | 3AD | 2.70 | | |
| 19H | 3C | 2.72 | N/A | 2.41 |
| 19I | 3CD | 2.73 | 2.67 | 2.58 |
| 19J | 4AD | 2.71 | | |
| 19K | 4CD | 2.71 | | |
| 19L | 2AD:4AD 7:3 | 2.84 | | |
| 19M | 1CD:4CD 7:3 | 2.82 | | |
| 19N | 5CD | 2.54 | | |
| 19O | 6AD | 2.63 | | |
| 19P | 7CD | 2.34 | | |
| 19Q | 8CD | 2.23 | | |
| 19R | 9CD | 2.80 | | |
| 19S | 13CDa | 2.67 | | |
| 19T | 16CDb | 3.04 | | |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising:
   an aqueous continuous liquid phase; and
   composite particles dispersed in the aqueous continuous liquid phase, each composite particle comprising a non-cationic polymer core surrounded by a silica shell disposed on the polymer core, wherein the shell consists essentially of silica particles having a mean particle diameter of 3.2 nanometers or less, and wherein the polymer core comprises at least one polymer, wherein the weight ratio of the total amount of the silica in the composition to the total amount of the at least one polymer is in a range of 0.2 to 2.2, wherein the composition further comprises at least one metal cation having a charge of at least +2, and wherein the composition has a pH of 6 or less.

2. The composition of claim 1, wherein the weight ratio of the total amount of the silica in the composition to the total amount of the at least one polymer is in a range of 0.4 to 2.0.

3. The composition of claim 1, wherein the composition further comprises at least one of an organic orthosilicate or a partially hydrolyzed oligomer thereof.

4. The composition of claim 1, wherein the composition further comprises a water-soluble polymer.

5. The composition of claim 1, wherein the composition further comprises from 1 to 10 percent by weight of a hydrolyzable silane represented by the formula:

$$R^1Si(OR^2)_3$$

wherein
   $R^1$ represents a monovalent organic group; and
   each $R^2$ independently represents H, an alkyl group having from 1 to 4 carbon atoms, or an acyl group having from 1 to 4 carbon atoms.

6. A method of making an article, the method comprising applying the composition of claim 1 to a surface of a substrate, and at least partially drying the composition.

7. The method of claim 6, further comprising heating the at least partially dried composition to a temperature sufficient to burn out the polymer cores of at least a portion of the composite particles, leaving behind the corresponding hollow silica shells.

8. The method of claim 6, wherein the substrate is selected from the group consisting of lenses, filters, windshields, electronic illuminated displays, and solar panels.

9. An article made by the method of claim 6.

* * * * *